US012634904B2

(12) United States Patent
Park

(10) Patent No.: US 12,634,904 B2
(45) Date of Patent: May 19, 2026

(54) SIDELINK TRANSMITTING AND RECEIVING METHOD AND TERMINAL THEREFOR

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 714 days.

(21) Appl. No.: 17/265,960

(22) PCT Filed: Aug. 8, 2019

(86) PCT No.: PCT/KR2019/009938
§ 371 (c)(1),
(2) Date: Feb. 4, 2021

(87) PCT Pub. No.: WO2020/032605
PCT Pub. Date: Feb. 13, 2020

(65) Prior Publication Data
US 2021/0377943 A1    Dec. 2, 2021

(30) Foreign Application Priority Data

| Aug. 9, 2018 | (KR) | ......................... 10-2018-0093015 |
| Aug. 9, 2018 | (KR) | ......................... 10-2018-0093030 |
| Aug. 6, 2019 | (KR) | ......................... 10-2019-0095644 |

(51) Int. Cl.
*H04W 72/0453*        (2023.01)

(52) U.S. Cl.
CPC .............................. *H04W 72/0453* (2013.01)

(58) Field of Classification Search
CPC . H04W 72/0453; H04W 92/18; H04W 72/23; H04W 72/535; H04L 5/001; H04L 5/0094; H04L 5/0007
See application file for complete search history.

(56) References Cited

U.S. PATENT DOCUMENTS

| 2018/0183551 A1 | 6/2018 | Chou et al. |
| 2020/0029318 A1* | 1/2020 | Guo ....................... H04L 1/1822 |
| 2020/0259627 A1* | 8/2020 | Loehr ................... H04W 72/56 |
| 2021/0013997 A1* | 1/2021 | Liu ............................ H04L 1/00 |
| 2021/0160876 A1* | 5/2021 | Osawa .............. H04W 72/0453 |
| 2021/0195593 A1* | 6/2021 | Shen ......................... H04L 5/14 |
| 2021/0352623 A1* | 11/2021 | Wang ................ H04W 72/0453 |

OTHER PUBLICATIONS

Huawei et al., "Summary of remaining issues on bandwidth part and wideband operation", R1-1801347, 3GPP TSG RAN WG1 Meeting #92, Athens, Greece, Feb. 26-Mar. 2, 2018.

(Continued)

*Primary Examiner* — Peter P Chau
(74) *Attorney, Agent, or Firm* — INVENSTONE PATENT, LLC

(57) ABSTRACT

Provided are a sidelink transmitting and receiving method and a terminal therefor. The method comprising: configuring a sidelink bandwidth part; and configuring sidelink numerology for transmission/reception through a sidelink and performing the transmission/reception with another terminal through the sidelink by using, together, the configured sidelink bandwidth part.

14 Claims, 15 Drawing Sheets

1300

(56) References Cited

OTHER PUBLICATIONS

Catt, "Remaining details on synchronization for carrier aggregation in V2X Phase 2", R1-1806263, 3GPP TSG RAN WG1 Meeting #93, Busan, Korea, May 21-25, 2018.

Intel Corporation, "On Sidelink Resource Pool Sharing for eNB-Controlled and UE-Autonomous V2V Transmission Modes", R1-1806484, 3GPP TSG RAN WG1 Meeting #93, Busan, Korea, May 21-25, 2018, pp. 1-5.

Samsung, "Synchronization in V2X CA", R1-1806678, 3GPP TSG RAN WG1 #93, Busan, Korea, May 21-25, 2018, pp. 1-4.

* cited by examiner

Subcarrier Number

239

192

182

56

47

0

PSS

PBCH

PBCH

SSS

PBCH

PBCH

PBCH 0    1    2    3

OFDM symbol number

DMRS location for Rel. 12/13 PSBCH
PSCCH/PSSCH

AGC    Data symbol    DMRS symbol    GP

DMRS location for V2V PSBCH/PSSCH

AGC    Data symbol    DMRS symbol    GP

GNSS

Receivable or not eNB ((o)) UE G-1

((o)) UE N-1

((o)) UE X ((o)) UE G-1

((o)) UE N-2

((o)) UE G-2

((o)) OON UE

SIDELINK TRANSMITTING AND RECEIVING METHOD AND TERMINAL THEREFOR

CROSS REFERENCE TO RELATED APPLICATIONS

This application is a National Stage Patent Application of PCT International Patent Application No. PCT/KR2019/009938 (filed on Aug. 8, 2019) under 35 U.S.C. § 371, which claims priority to Korean Patent Application Nos. 10-2018-0093015 (filed on Aug. 9, 2018), 10-2018-0093030 (filed on Aug. 9, 2018), and 10-2019-0095644 (filed on Aug. 6, 2019), the teachings of which are incorporated herein in their entireties by reference.

TECHNICAL FIELD

The present disclosure relates to methods and apparatuses for transmitting and receiving a signal for providing vehicle-to-everything (V2X) service in a next-generation/5G radio access network (hereinafter, referred to as a new radio, "NR").

BACKGROUND ART

There are demands for large-capacity data processing, high-speed data processing, and various service demands using wireless terminals in vehicles and industrial sites. There is a need for a technology for a high-speed and large-capacity communication system capable of processing various scenarios and large-capacity data, such as video, wireless data, and machine-type communication data, beyond a simple voice-oriented service.

To this end, International telecommunication unit radio communication sector (ITU-R) discloses the requirements for adopting the international mobile telecommunications (IMT)-2020 international standard, and research on next-generation wireless communication technology is in progress to meet the requirements of the IMT-2020.

In particular, $3^{rd}$ generation partnership project (3GPP) is conducting research on the Long-term evolution (LTE)-Advanced Pro Rel-15/16 standard and the NR (New Radio Access Technology) standard in parallel to satisfy the IMT-2020 requirements referred to as 5th generation (5G) technology. It plans to receive approval as the next generation wireless communication technology.

Currently, a sidelink (SL) for data to desktop (D2D) and V2X wireless communication are being discussed in the New Radio Access Technology (NR) standard.

DETAILED DESCRIPTION OF THE INVENTION

Technical Problem

In accordance with embodiments of the present disclosure, a sidelink transmission/reception methods and apparatuses are provided for effectively performing transmission/reception through the sidelink (SL) with the other user equipment using a sidelink bandwidth part (SL BWP).

Technical Solution

In accordance with one aspect of the present disclosure, a method of a user equipment is provided for performing transmission/reception through a sidelink (SL) with the other user equipment. The method may include: configuring a sidelink bandwidth part (SL BWP), configuring a sidelink numerology for the transmission/reception through the sidelink (SL) and performing the transmission/reception through the sidelink (SL) with the other user equipment commonly using the configured sidelink bandwidth part (SL BWP).

In accordance with further another aspect of the present disclosure, a user equipment is provided for performing transmission/reception through a sidelink (SL) with the other user equipment. The user equipment may include: a controller configuring a sidelink bandwidth part (SL BWP) and a sidelink numerology for the transmission/reception through the sidelink (SL) and a transceiver performing the transmission/reception through the sidelink (SL) with the other user equipment commonly using the configured sidelink bandwidth part (SL BWP).

Advantageous Effects

In accordance with embodiments of the present disclosure, it is possible to provide a sidelink transmission/reception methods and apparatuses for effectively performing the transmission/reception through the sidelink (SL) with other user equipment using the sidelink bandwidth part (SL BWP).

MODE FOR CARRYING OUT THE INVENTION

Figure 1:
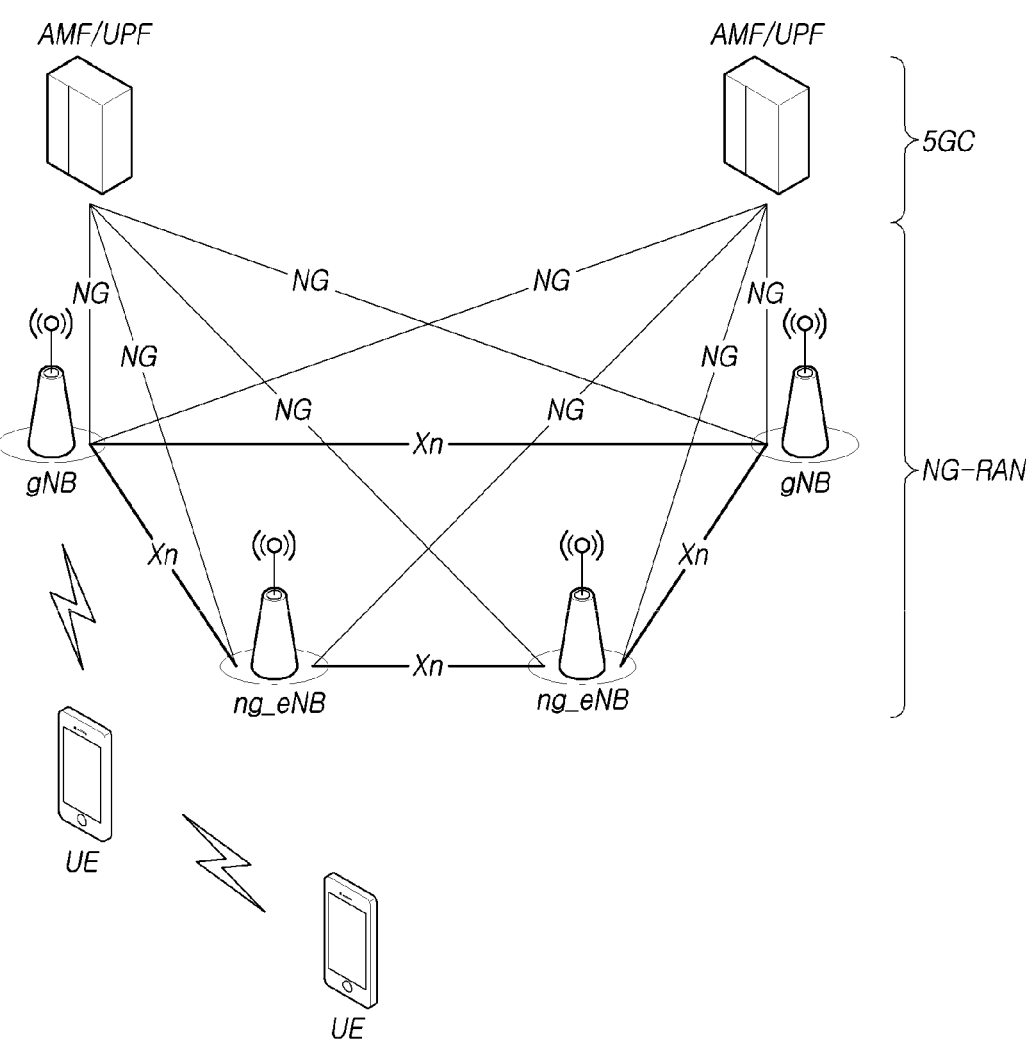
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In addition, terms and technical names used in this specification are for describing specific embodiments, and the technical idea is not limited to the terms. The terms described below may be interpreted as meanings generally understood by those of ordinary skill in the technical field to which the present technical idea belongs unless otherwise defined. When the corresponding term is an incorrect technical term that does not accurately express the present technical idea, it should be understood by being substituted with a technical term that can be correctly understood by those skilled in the art. In addition, general terms used in the present specification should be interpreted as defined in the dictionary or according to the context before and after, and should not be interpreted as an excessively reduced meaning.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission/reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
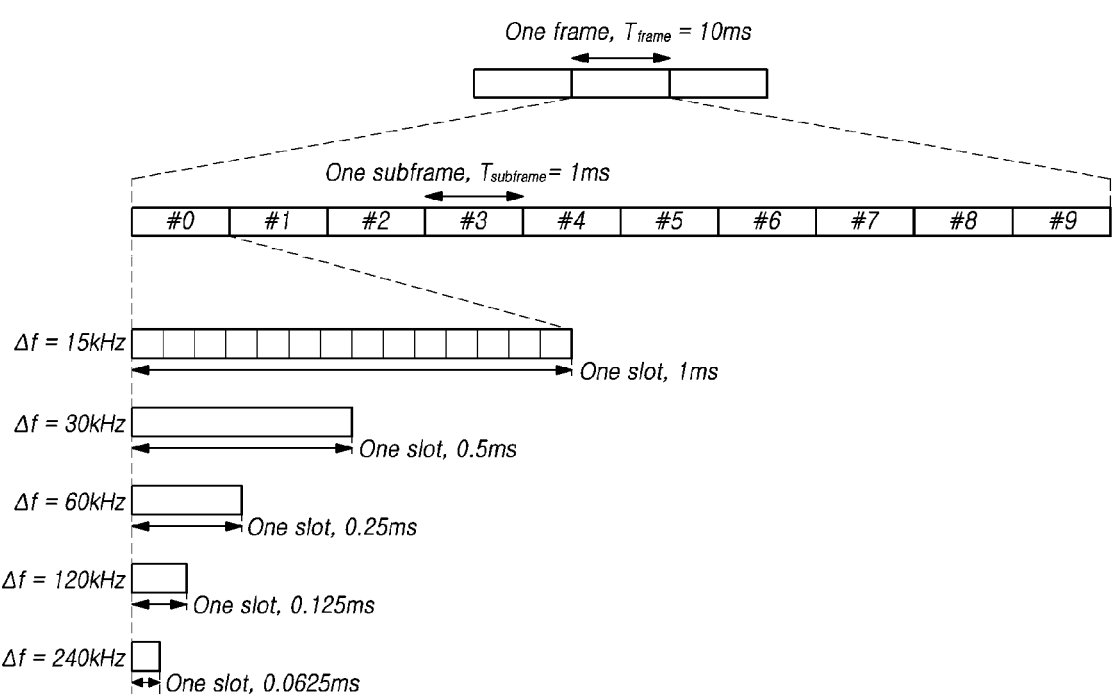
FIG. 2 is a view schematically illustrating a frame structure in an NR system in accordance with embodiments of the present disclosure.

FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
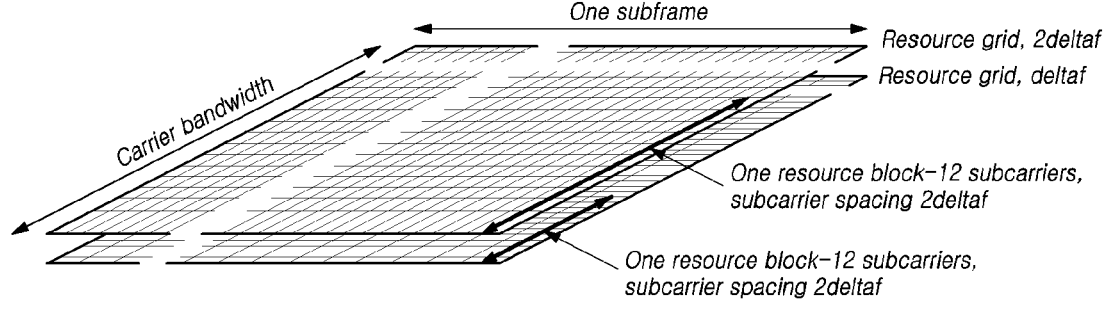
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
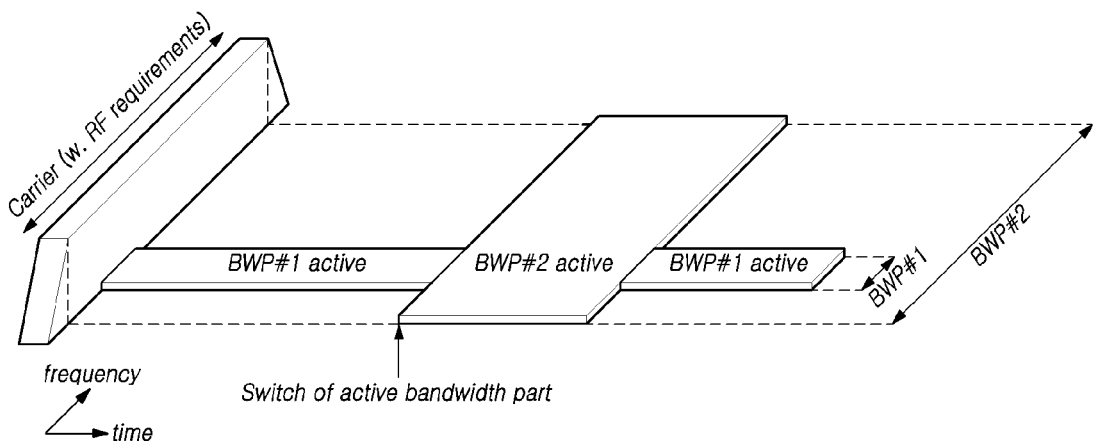
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
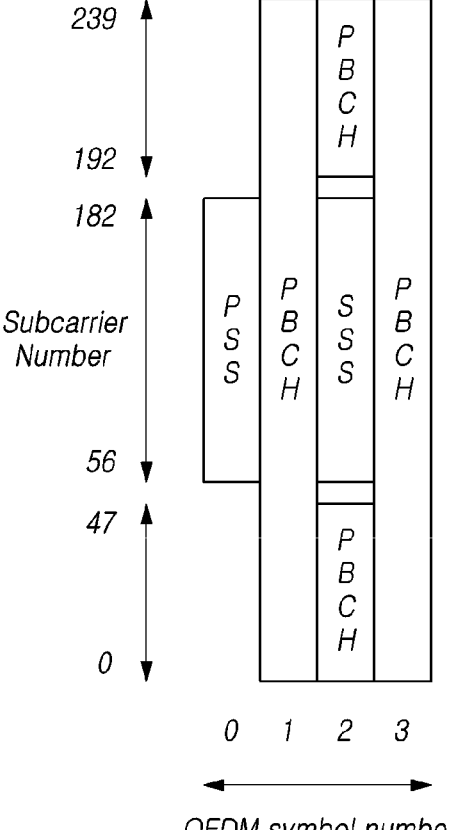
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
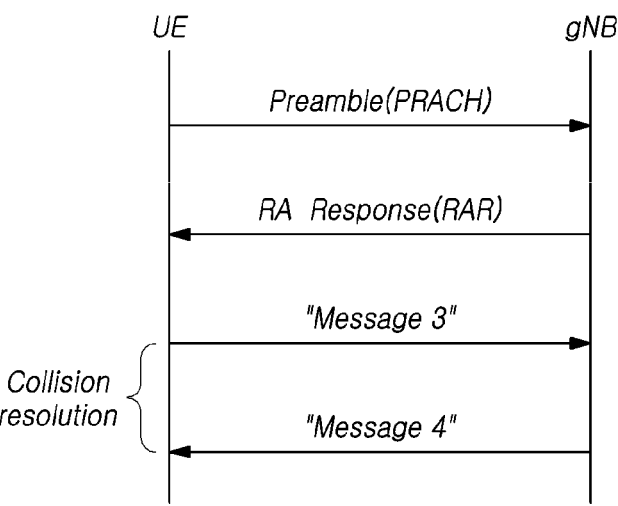
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
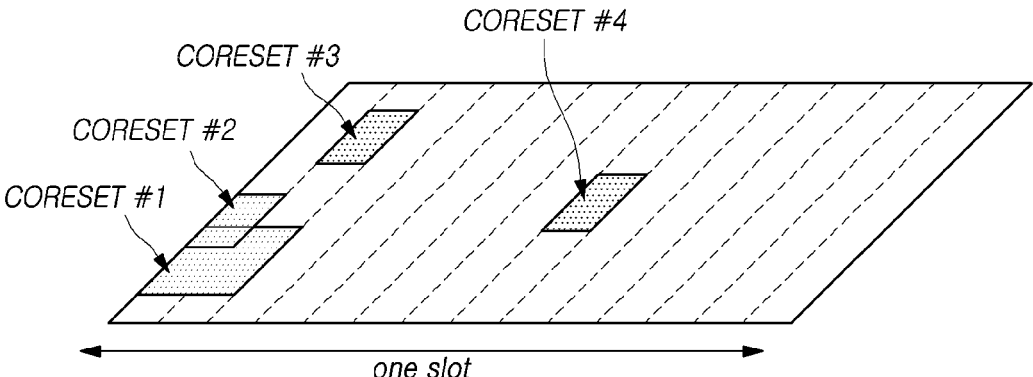
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14 and determined key performance requirements according to road conditions. In addition, the 3GPP have derived 25 service scenarios, such as vehicle platooning, advanced driving, remote driving, an extended sensor, or the like, evolved from Rel-14 and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Sidelink Physical Layer Design>

For the V2X communication, in order to improve the channel estimation performance and the frequency offset estimation performance, it is necessary to allocate more of the pilot signal such as DMRS (Demodulation Reference Signal) than the D2D communication.

Figure 8A:
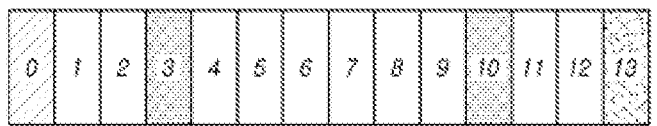
FIG. 8A and FIG. 8B show PUCCH structures in a radio access technology.
Figure 8B:
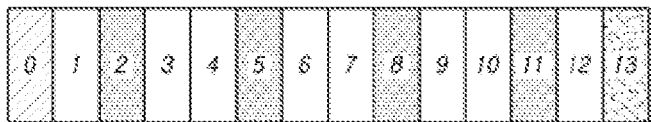

FIG. 8A is a diagram for explaining a typical DMRS structure for a sidelink, and FIG. 8B is a diagram for explaining a DMRS structure for a sidelink according to an embodiment.

As shown in FIG. 8A, two typical (Rel-12/13) DMRSs are allocated per subframe of PSCCH, PSSCH, and PSBCH, and the interval between DMRSs is 0.5 ms. The C-V2X UE uses the 6 GHz center frequency band defined for the sidelink transmission, and the vehicle UE moves at 280 km/h in consideration of the relative speed. At this time, the correlation time is 0.277 ms, and since this value is shorter than the interval between the reference signals of Rel-12/13, the channel estimation time is insufficient. To solve this problem, in the sidelink for the V2X communication, the number of DMRSs per subframe was increased to 4, and the interval between the reference signals was reduced to 0.214 ms, so that the design of the physical layer was changed to facilitate channel estimation even with rapid channel changes.

On the other hand, FIG. 8B shows an example of a method of selecting a DMRS symbol pattern. For example, PSCCH/PSSCH allocates DMRS to 2/5/8/11 OFDM symbols in a dedicated carrier, and PSBCH allocates DMRS to 3/5/8/10 OFDM symbol. In the 2 GHz band, the Rel-12/13 method with two DMRSs can be used as it is. That is, the number and pattern of DMRS transmissions may be differently configured according to the channel and carrier frequency band.

In addition, because the TDM (Time Division Multiplexing) scheme used in the D2D is not suitable for the C-V2X, in which a plurality of vehicles are concentrated and connected simultaneously, a frequency division multiplexing (FDM) scheme is used.

<Resource Assignment>

Figure 9:
FIG. 9 is a view for explaining various scenarios for V2X communication.

FIG. 9 illustrates various scenarios for V2X communication.

Referring to FIG. 9, a V2X device (e.g., a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N−1, UE G−1, UE X) in coverage of the base station, or communication may be performed between a UE in coverage of the base station and a UE (e.g., UE N−1, UE N−2) outside of coverage of the base station. Alternatively, communication may be performed between UEs (e.g., UE G−1, UE G−2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined. Two modes include i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 10A:
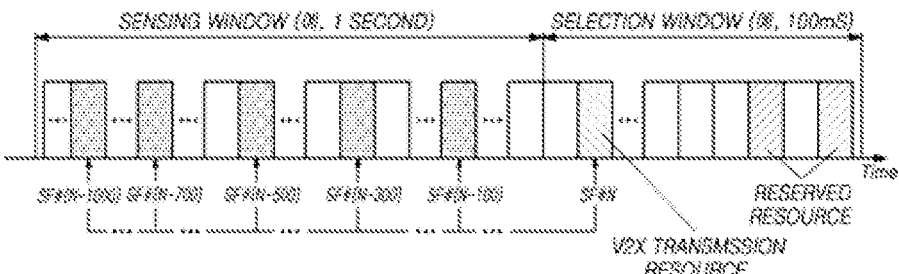
FIG. 10A and FIG. 10B illustrate a first user equipment (UE1) and a second user equipment (UE2) performing sidelink communication, and an example of resource pools used by the UEs.
Figure 10B:
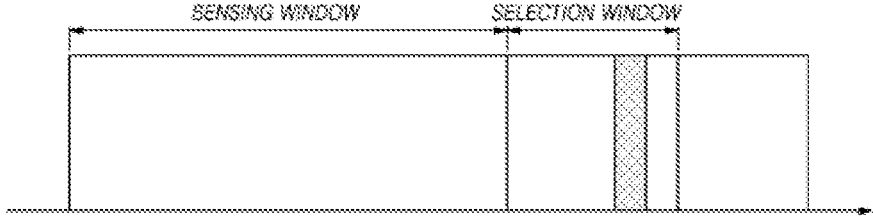

FIG. 10A and FIG. 10B illustrate a first user equipment (UE1) and a second user equipment (UE2) performing sidelink communication, and an example of resource pools used by the UEs.

Referring to FIGS. 9, 10A and 10B, an eNB represents a base station; however, a gNB or an ng-eNB may represent a base station as described above. Further, the UEs represent mobile terminals; however, the UEs may represent vehicles, infrastructures, or the like variously depending on scenarios or situations.

In FIG. 10A, the transmitter UE (UE 1) may select a resource unit corresponding to a specific resource within a resource pool including a set of resources and transmit a sidelink signal using the resource unit. The receiver UE (UE 2) may be configured with a resource pool over which the UE 1 is allowed to transmit a signal and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 10B, the entire frequency resource is divided into NF frequency resources, and the entire time resource is divided into NT time resources. Thus, a total of NF*NT resource units may be defined. In this case, a corresponding resource pool may be repeated at a period of NT subframes. In particular, one resource unit may be configured to be provided periodically and repeatedly.

The resource pool may be classified into several types according to a certain criterion. For example, the resource pool may be classified into several types according to contents of a sidelink signal transmitted over each resource pool. For example, the contents of the sidelink signal may be classified, and a separate resource pool may be configured for each of the contents. Scheduling assignment (SA), a sidelink channel, a discovery channel, or the like may be examples of the contents of the sidelink signal.

The scheduling assignment (SA) may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the scheduling assignment (SA) is transmitted by being multiplexed with the sidelink data.

An FDM scheme applied to the V2X communication may reduce a time delay caused until assigning a data resource after a SA resource has been assigned. For example, such an FDM scheme may include i) a non-adjacent scheme in which a control channel resource and a data channel resource are split in time domain in one subframe and ii) an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary to perform communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a preconfigured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. When UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described, unlike the V2X based on the LTE system, it is required to develop NR-based V2X technology for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 11:
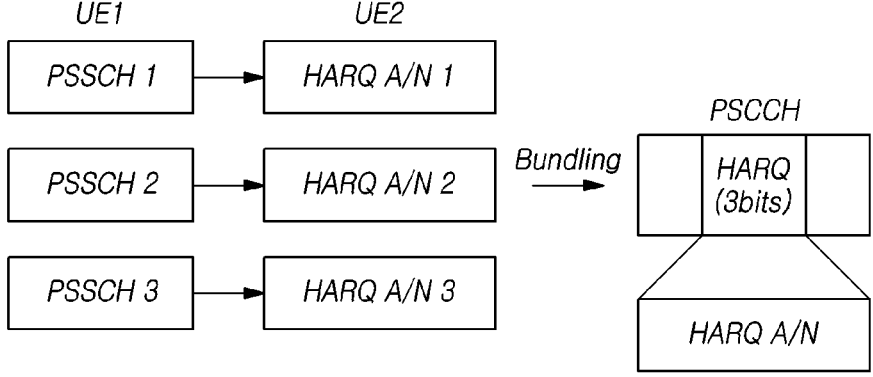
FIG. 11 is a view for explaining a method of bundling and transmitting HARQ feedback information in the V2X.

FIG. 11 is a diagram for describing a method of bundling and transmitting HARQ feedback information in the V2X.

Referring to FIG. 11, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 11 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

Figure 12:
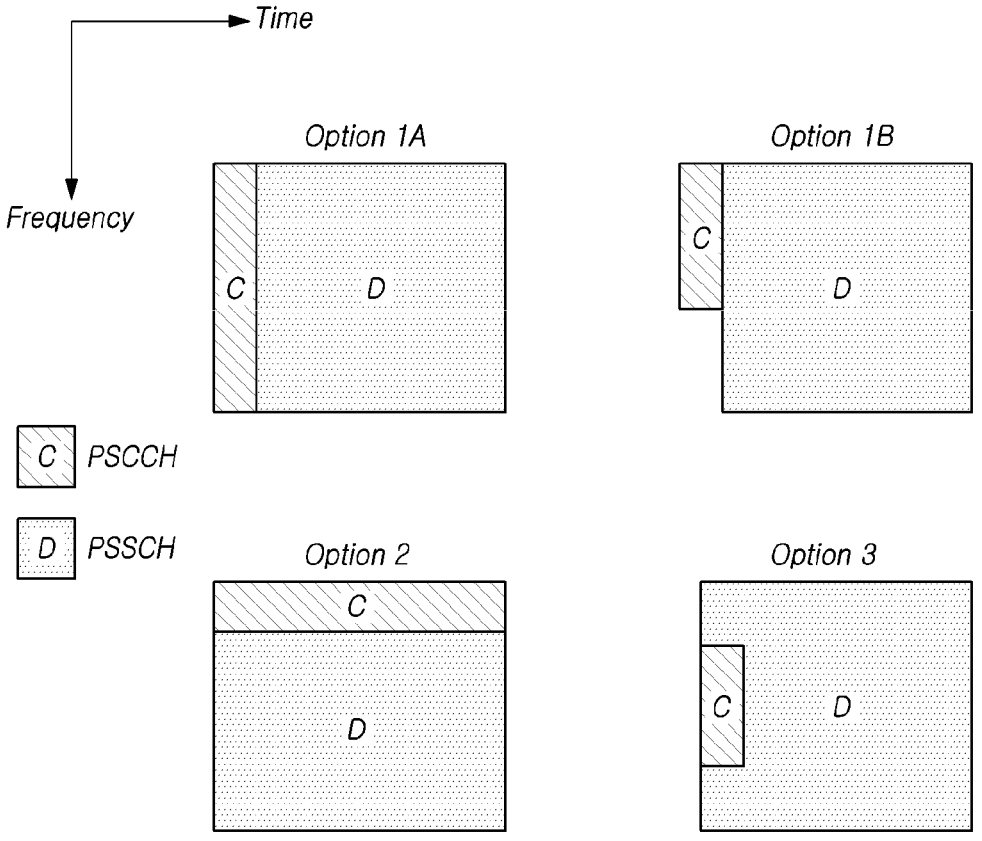
FIG. 12 shows examples of multiplexing of PSSCH associated with PSCCH.

The following four options have been discussed for multiplexing of a PSCCH and an associated PSSCH, as illustrated in FIG. 12. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e. a mode 1 and a mode 2, may by defined for NR V2X sidelink communication. In mode 1, a base station schedules one or more sidelink resources used by a UE for sidelink transmission. In the mode 2, a UE determines one or more resources within one or more sidelink resources configured by a base station or one or more pre-configured sidelink resources.

The mode 2 may cover the following resource assignment sub-modes. That is, a UE may automatically select a sidelink resource for transmission, help to select a sidelink resource for other UE(s), be configured with grant configured for sidelink transmission, or schedule the sidelink transmission of other UE(s).

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC. However, the NR is designed to support the UE of NR having different transmission/reception bandwidth capabilities over a single wideband NR CC. Accordingly, it is required to configure one or more bandwidth parts (BWPs) including subdivided bandwidths for an NR CC, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Hereinafter, a method of configuring the bandwidth part (BWP) for the NR sidelink (SL) according to a first embodiment (embodiment 1) of the present disclosure will be described, and a method of defining a numerology for the NR sidelink according to a second embodiment (embodiment 2) of the present disclosure will be described with reference to the drawings.

Embodiment 1

The first embodiment (embodiment 1) proposes a method of configuring the bandwidth part (BWP) for the NR sidelink (SL).

As described above, in the NR, up to four downlink or uplink bandwidth parts (BWPs) may be configured for the UE accessing the cell, and one bandwidth part is activated at a certain point in time, and it is defined to activate one bandwidth part (BWP) at a certain point in time and be used for the downlink transmission and the uplink transmission, respectively.

In particular, in the case of the cell configured through the unpaired spectrum, the downlink/uplink bandwidth parts (BWPs) of the same ID are associated with each other, and the downlink/uplink bandwidth parts (BWPs) of the same ID are defined to share a center frequency. That is, in the case of the unpaired spectrum, there is supported configuration and activation of the bandwidth parts (BWPs) in the form of a downlink/uplink bandwidth part pair.

On the other hand, in the case of the paired spectrum, the association between the downlink/uplink bandwidth parts (BWPs) is not defined, and each downlink/uplink bandwidth part (BWP) is independently configured, activated, and used.

When design is made for the sidelink (SL) for D2D or V2V wireless communication in the NR, the corresponding sidelink (SL) may be defined to perform the sidelink transmission/reception through the uplink subframe in the same manner as LTE.

In the present embodiment, a method may be provided for configuring, activating and using the bandwidth part (BWP) for the sidelink transmission/reception based on a case in which the NR sidelink is configured through the uplink subframe, that is, the uplink slot as described above. However, the same concept may be applied even when the NR sidelink configuration is performed through the downlink slot, which is included in the scope of the present disclosure.

As the radio signal and the radio channel additionally transmitted through the sidelink (SL), there may be the PSSS/SSSS and the PSBCH, the PSDCH, the PSCCH, the PSSCH, etc., in the same manner as the radio signal and radio channel defined in the LTE, and additionally a new radio signal or radio channel may be defined through the NR sidelink. The sidelink transmission/reception described in the present embodiment may include not only the sidelink radio signal and the radio channel defined above, but also all sidelink radio signals and radio channels that may be newly defined in the NR.

Embodiment 1-1. Use by Configuring/Activating a Separate Sidelink Bandwidth Part (SL BWP)

It may be defined to configure a separate sidelink bandwidth part(s) (SL BWP(s)) for the sidelink transmission/reception separately from the downlink bandwidth part(s) (DL BWP(s)) and the uplink bandwidth part(s) (UL BWP(s)) for any UE in the base station/network.

In this case, by activating the separate sidelink bandwidth part(s) (SL BWP(s)) configured for the sidelink transmission/reception, it may be defined to be used for the transmission/reception of the radio signal or the radio channel through the sidelink (SL). The sidelink bandwidth part(s) (SL BWP(s)) may be configured through the uplink band or the uplink slot of the UE.

As an example of configuring the separate sidelink bandwidth part (SL BWP), the sidelink bandwidth part (SL BWP) may be configured as a cell-specific or UE-group common in any serving cell. In this case, the configuration information of the corresponding sidelink bandwidth part (SL BWP) may be transmitted to the UE through the cell-specific or the UE-group common higher layer signaling, or through the UE-specific higher layer signaling.

In this case, the configuration information of the sidelink bandwidth part (BWP) may include information on the numerology described in the second embodiment (embodiment 2). That is, the numerology may be part of the configuration information of the sidelink bandwidth part (BWP).

The corresponding cell-specific or the UE-group common sidelink bandwidth part (SL BWP) may be defined such that only at most one sidelink bandwidth part (BW) is configured for an arbitrary serving cell or a UE-group belonging to the serving cell. In this case, the UE may be defined to activate and use the single sidelink bandwidth part (SL BWP) for the sidelink transmission/reception.

The NR sidelink bandwidth part (BWP) for each UE may be configured through the cell-specific or the UE-group common higher layer signaling, and the subcarrier spacing (SCS) and the cyclic prefix (CP) values may be configured for each corresponding bandwidth part (BWP). In this case, that the UE may apply the SCS and the CP values of the active sidelink bandwidth part (SL BWP) for the NR sidelink transmission/reception.

The corresponding cell-specific or the UE-group common sidelink bandwidth part (SL BWP) may be defined so that a maximum of N sidelink bandwidth parts (BWPs) are configured for the arbitrary serving cell or the UE-group belonging to the arbitrary serving cell. However, the value of the N may have a fixed natural number value or may be configured by the base station.

In this case, the UE may be defined to activate one of the N sidelink bandwidth parts (BWPs) to be used for the sidelink transmission/reception. However, an activation information of one sidelink bandwidth part for the sidelink transmission/reception may be explicitly indicated by the base station or may be implicitly defined to enable one sidelink bandwidth part to be activated.

The base station may transmit the explicit activation indication information of the sidelink bandwidth part to the UE through the UE-specific higher layer signaling, the MAC CE signaling or the physical layer control signaling (L1 control signaling).

As an example of a method for implicitly activating the sidelink bandwidth part (SL BWP), the activation of the sidelink bandwidth part (SL BWP) for the sidelink transmission/reception may be determined by an active uplink bandwidth part (or an active downlink bandwidth part) of the UE.

As another example of a method of implicitly activating the sidelink bandwidth part (SL BWP), it may be defined to activate the sidelink bandwidth part for the sidelink transmission or reception by the configuration information of the resource pool for the sidelink transmission or reception. Alternatively, a separate sidelink bandwidth part (SL BWP) may be activated and used for each sidelink transmission or each sidelink reception or according to the type of the sidelink radio signal or the sidelink radio channel. This can also be explicitly indicated or implicitly determined by the base station as described above.

As another example of configuring a separate sidelink bandwidth part (SL BWP), the sidelink bandwidth part (SL BWP) may be configured to be UE-specific for each UE. In this case, the base station may transmit the configuration information of the UE-specific sidelink bandwidth part through the UE-specific higher layer signaling. Similar to the example of configuring the cell-specific sidelink bandwidth part (SL BWP) described above, the corresponding UE-specific sidelink bandwidth part (SL BWP) may be defined to be configured such that only one is configured for UE.

Alternatively, the NR sidelink bandwidth part (SL BWP) may be configured through the UE-specific higher layer signaling for each UE, and the SCS and the CP values may be configured for each corresponding bandwidth part (BWP). In this case, it may be defined that the SCS and the CP values of the active sidelink bandwidth part (SL BWP) are applied for the NR sidelink transmission/reception in UE.

In this case, the corresponding UE may be defined to activate and use a corresponding single sidelink bandwidth part (SL BWP) for the sidelink transmission/reception without receiving additional activation-related indication information.

Alternatively, the UE-specific sidelink bandwidth part (SL BWP) may be defined so that a maximum of N sidelink bandwidth parts (SL BWPs) are configured for UE. However, the value of the N may have a fixed natural number value or may be configured by the base station. In this case, the UE may define to activate one of the N sidelink band-width parts (SL BWPs) and use it for the sidelink transmission/reception.

However, the activation information of one sidelink band-width part (SL BWP) for the sidelink transmission/reception may be explicitly indicated by the base station or may be implicitly defined to enable one sidelink bandwidth part (SL BWP) to be activated.

The base station may transmit the explicit activation indication information of the sidelink bandwidth part (SL BWP) to the UE through the UE-specific higher layer signaling, the MAC CE signaling, or the physical layer control signaling (L1 control signaling).

As an example of an method of implicitly activating the sidelink bandwidth part (SL BWP), the activation of the sidelink bandwidth part (SL BWP) for the sidelink transmission/reception may be determined by the active uplink bandwidth part (or the active downlink bandwidth part) of the UE.

As another example of a method of implicitly activating the sidelink bandwidth part (SL BWP), it may be defined to activate the sidelink bandwidth part (SL BWP) for the sidelink transmission or reception by the configuration information of the resource pool for the sidelink transmission or reception. Alternatively, a separate sidelink bandwidth part (SL BWP) may be activated and used for each corresponding sidelink transmission or reception or according to the type of the sidelink radio signal or the sidelink radio channel, and this may also be explicitly indicated or implicitly determined by the base station as described above.

Embodiment 1-2. Use of the Uplink Bandwidth Part Configured for Each UE for the Sidelink Transmission/Reception In order to configure the sidelink bandwidth part (SL BWP) for the sidelink transmission or reception, the UE may be defined to reuse the configuration information of the uplink bandwidth part (UL BWP) configured for the corresponding UE. That is, the configuration of the sidelink bandwidth part for sidelink transmission/reception in UE may be defined to follow the uplink bandwidth part config-ured for the corresponding UE.

In this case, as a method of activating one sidelink bandwidth part for the sidelink transmission/reception, the active sidelink bandwidth part (SL BWP) for the corre-sponding UE may be defined to be determined by the uplink bandwidth part (UL BWP) activated in the corresponding UE. That is, it may be defined to transmit/receive the sidelink radio signal and the radio channel through the active uplink bandwidth part (UL BWP).

Alternatively, only the configuration of the bandwidth part (BWP) for the sidelink transmission/reception is defined to follow the configuration information of the uplink band-width part (UL BWP), and the activation of the sidelink bandwidth part (SL BWP) (that is, the corresponding uplink bandwidth part (UL BWP)) for the sidelink transmission/ reception may be defined to be performed separately from the active uplink bandwidth part (UL BWP) for the link transmission.

In this case, the activation of the corresponding sidelink bandwidth part (SL BWP) (that is, the corresponding uplink bandwidth part (UL BWP)) may be explicitly indicated by the base station or may be implicitly determined in the same manner as in the embodiment 1-1, and the details thereof may be the same as the embodiment 1-1 described above.

Embodiment 1-3. Definition of the Associated Sidelink Bandwidth Part (SL BWP) for Each Uplink Bandwidth Part (UL BWP)

As another method for configuring the sidelink bandwidth part (SL BWP) for UE, it may be defined to configure an associated sidelink bandwidth part for each uplink band-width part (UL BWP) configured for a corresponding UE. Specifically, it may be defined to configure one associated sidelink bandwidth part (SL BWP) for all uplink bandwidth parts (UL BWPs) configured for UE. Alternatively, it may be defined to configure one or more sidelink bandwidth part(s) (SL BWP(s)) associated with all uplink bandwidth parts (UL BWPs). Alternatively, it may be defined to configure the associated sidelink bandwidth part (SL BWP) for at least one uplink bandwidth part (UL BWP) among all the uplink bandwidth parts (UL BWPs).

When the sidelink bandwidth part (SL BWP) associated with each uplink bandwidth part (UL BWP) is configured as described above, the center frequency of the sidelink band-width part (SL BWP) may be configured to be the same as that of the associated uplink bandwidth part (UL BWP).

As described above, when the sidelink bandwidth part associated for each uplink bandwidth part is configured, as a method of activating one sidelink bandwidth part (SL BWP) for the sidelink transmission/reception in the certain UE, the activation of the corresponding sidelink bandwidth part (SL BWP) may be defined to be determined by the activation of the uplink bandwidth part (UL BWP). That is, the sidelink bandwidth part (SL BWP) associated with an active uplink bandwidth part (UL BWP) activated for the uplink transmission in UE may be defined to be activated and used by the corresponding UE for the sidelink trans-mission or reception.

Alternatively, as described above, when one or more associated sidelink bandwidth parts (SL BWPs) are config-ured for one uplink bandwidth part (UL BWP), each sidelink bandwidth part (SL BWP) may be configured separately for the sidelink transmission/reception. It may be also config-ured separately according to the type of the sidelink radio signals or the radio channels. Accordingly, the bandwidth part (BWP) for the sidelink transmission and the bandwidth part (BWB) for the sidelink reception for each sidelink transmission or reception in the corresponding active uplink bandwidth part (UL BWP) may be defined to be activated respectively, or the sidelink bandwidth part (SL BWP) for each of the sidelink radio signal or the sidelink radio channel may be defined to be activated.

Embodiment 1-4. Use of the Sidelink Bandwidth Part Configured by a Sidelink Synchronization Source Node As another method for configuring the sidelink bandwidth part (SL BWP) for UE, the configuration of the sidelink bandwidth part (SL BWP) may be performed by a synchro-nization source node (i.e. a base station or a UE transmitting PSS/SSS and PSBCH) configuring the arbitrary sidelink (SL).

The configuration information of the sidelink bandwidth part (SL BWP) configured by the synchronization source node as described above may be defined to be transmitted to neighboring sidelink UEs through the PSBCH or to neigh-boring sidelink UEs through the PSDCH.

In this case, the sidelink bandwidth part (SL BWP) by the synchronization source node may be defined so that only at most one sidelink bandwidth part (SL BWP) is configured. In this case, it may be defined to use one corresponding sidelink bandwidth part (SL BWP) for the sidelink transmission/reception without an activation indication for a separate sidelink bandwidth part (SL BWP).

Alternatively, the sidelink bandwidth part (SL BWP) by the synchronization source node may be defined such that a maximum of N sidelink bandwidth parts (SL BWPs) are configured. However, the value of N may have a fixed natural number or may be configured by the synchronization source node. In this case, the activation indication information of the sidelink bandwidth part (SL BWP) for the sidelink transmission/reception in UE may be transmitted by the synchronization source node, and the corresponding activation indication information of the sidelink bandwidth part (SL BWP) may be transmitted through the PSBCH, the PSDCH or the PSCCH.

However, when UE operates as the synchronization source node, it may be defined so that the base station transmits the configuration information of sidelink bandwidth part for the synchronization source UE. In this case, the corresponding information may be transmitted to the synchronization source UE through the cell-specific higher layer signaling or the UE-specific higher layer signaling.

In addition, a scheme for configuring and activating the bandwidth part (BWP) for the NR sidelink transmission/reception may be defined as one or more embodiments or a combination of one or more embodiments with respect to the above-described embodiments, which may be included in the scope of the present disclosure.

Embodiment 2

The second embodiment (embodiment 2) proposes a method of configuring the numerology for the NR sidelink (SL).

According to a method for transmitting and receiving the sidelink radio synchronization signal and the sidelink radio broadcast channel defined in LTE, that is, the PSSS/SSSS and the PSBCH, it is defined to transmit and receive the PSSS/SSSS and the PSBCH based on the numerology of the SCS of 15 kHz and the normal or the extended CP, which satisfies a condition configured by the network or is allocated among an uplink frequency band or an uplink subframe for the sidelink transmission/reception by the sidelink source node (e.g. the base station or the sidelink UE) satisfying a pre-configured condition, or through the sidelink resources of a pre-configured uplink subframe.

As a similar method, it is defined to transmit and receive i) the PSDCH for transmitting and receiving the sidelink discovery information and ii) the PSCCH and the PSSCH for transmitting and receiving the sidelink control information and the sidelink data information respectively, based on the numerology of the SCS of 15 kHz and the normal or the extended CP.

According to a method for configuring the SCS and the CP for the uplink/downlink transmission/reception defined in NR, the PSS/SSS and the PBCH for the synchronization of the U is defined to be transmitted based on the SCS of 15 kHZ and 30 kHz and the normal CP or the SCS of 120 kHz and 240 kHz and the normal CP according to the frequency range (FR) in which the cell is configured. In addition, the SCS value for RMSI (Remaining System Information) transmission/reception through the MIB transmitted through the PBCH is cell-specifically configured and transmitted to the UE, and the SCS and the CP values for transmitting and receiving the uplink/downlink control channel and data channel and other reference signals (e.g. CSI-RS, DM-RS, PTRS, TRS, SRS, etc.) for each UE are defined to be configured for each bandwidth part (BWP) configured for each UE through the UE-specific higher layer signaling.

The present disclosure introduces a method for configuring a numerology such as the SCS and the CP values for transmitting and receiving the NR sidelink (SL) which is a radio link for direct communication between the UEs through the PC5 interface, which is a wireless interface between the UEs for providing V2X service in NR.

Embodiment 2-1: Method for Configuring the NR Sidelink Numerology

Embodiment 2-1-1. Explicit Configuration

The SCS and the CP values for the NR sidelink transmission/reception may be configured by the base station and explicitly signaled to the UE.

As an example of explicitly configuring the sidelink SCS and CP, the SCS and the CP values for the NR sidelink transmission/reception may be defined to be configured by the base station and transmitted to the UE through the higher layer signaling.

Specifically, the SCS value or CP value for the NR sidelink transmission/reception may be configured semi-statically and may be defined to be transmitted to the UE in the corresponding cell through the cell-specific higher layer signaling. Accordingly, when the sidelink radio signal or the sidelink radio channel is transmitted from the UE in the corresponding cell, it may be defined to follow a value configured through the cell-specific upper layer signaling of the base station.

As another example of semi-static configuration, the SCS value or the CP value for the NR sidelink transmission/reception may be defined to be configured for each UE in the corresponding cell through the UE-specific higher layer signaling.

As another example of the explicit configuration, the SCS and CP values for the sidelink transmission/reception in the certain UE are dynamically configured and defined to be transmitted to the UE in the corresponding cell through the MAC signaling (the MAC CE signaling) or the physical layer control signaling (the L1 control signaling), that is, the DCI transmitted through the PDCCH. However, the corresponding PDCCH may be configured for each UE group in the corresponding cell through the UE-group common PDCCH, or the corresponding PDCCH may be configured for each UE through the UE-specific PDCCH.

Alternatively, a method of combining the semi-static configuration and the dynamic configuration may be applied. For example, the set of the SCS and the CP values applicable through the cell-specific or the UE-specific higher layer signaling may be configured, and the applied value for each UE may be semi-statically configured through the UE-specific higher layer signaling, or configured by the MAC CE signaling or the physical layer control signaling (the L1 control signaling). When the applied value for each UE is semi-statically configured through the UE-specific higher layer signaling, the applicable SCS value and the CP values may be configured through the cell-specific higher layer signaling.

Alternatively, the NR sidelink bandwidth part (SL BWP) for each UE may be configured through the UE-specific or the cell-specific upper layer signaling, and the SCS and the CP values may be configured for each corresponding bandwidth part. In this case, it may be defined that the SCS and CP values of the sidelink bandwidth part (SL BWP) activated for the NR sidelink transmission/reception in the arbitrary UE are applied.

Additionally, as an explicit signaling method for the NR sidelink transmission/reception, one or more of the above-described embodiments may be applied. In this case, it may be defined that the UE applies the SCS and the CP values configured through final signaling.

For example, it may be defined that the corresponding UE applies the most recently received configuration value. Alternatively, priority may be defined according to the signaling type in which the corresponding SCS and the corresponding CP values are configured. For example, when the SCS and the CP configuration values by the cell-specific higher layer signaling and the SCS and the CP configuration values by the UE-specific higher layer signaling collide with each other in the certain UE, it may be defined to apply the configuration value by UE-specific higher layer signaling. Alternatively, when a configuration value by the cell-specific or the UE-specific higher layer signaling and the configuration value by the physical layer control signaling collide with each other, it may be defined to apply the configuration value by the physical layer control signaling.

Embodiment 2-1-2. Implicit Configuration

The SCS and the CP values for the NR sidelink transmission/reception may be configured implicitly.

As an example of the implicit configuration, the SCS and the CP values for the NR sidelink transmission/reception may be defined to follow the SCS and the CP values of the PSS/SSS and PBCH of the cell to which the corresponding UE belongs.

As another example of the implicit configuration, the SCS and the CP values for the NR sidelink transmission/reception may be defined to follow the SCS and the CP values configured for the initial bandwidth part (BWP). For example, it may be defined to follow the SCS and the CP values for the initial active downlink bandwidth part (DL BWP), that is, the type 0-PDCCH CSS for the RMSI transmission/reception. Alternatively, it may be defined to follow the SCS and the CP values configured for the initial active uplink bandwidth part (UL BWP).

As another example of the implicit configuration, the SCS and the CP values for the NR sidelink transmission/reception may be defined to follow the SCS and the CP values configured for the first active bandwidth part (BWP) of the corresponding cell. That is, it may be defined to follow the SCS and the CP values configured for the first active downlink bandwidth part (DL BWP) or the first active uplink bandwidth part (UL BWP) of the corresponding cell.

As another example of the implicit configuration, the UE may be defined to follow the SCS and the CP values of the active downlink bandwidth part (DL BWP) or the active uplink bandwidth part (UL BWP) for the sidelink transmission/reception. Alternatively, it may be defined to follow the SCS and CP values of the UE-specific downlink bandwidth part (DL BWP) or the uplink bandwidth part (UL BWP) including the frequency resource on which sidelink transmission is performed.

Embodiment 2-1-3. Pre-Configured Based on FR

The corresponding SCS and the corresponding CP value may be defined by the frequency band in which the sidelink configuration is formed for the direct communication between the UEs in the UE, that is, the sidelink FR (Frequency Range).

However, as the sidelink SCS and the sidelink CP configuration method described above, all cases to which one or more of the above-described embodiments are applied are included in the scope of the present disclosure.

Embodiment 2-2. Configuration for Each NR Sidelink Radio Signal and Radio Channel

Embodiment 2-2-1. Configuration for Each Radio Signal and Radio Channel

The SCS and the CP values for the NR sidelink transmission/reception may be defined to be separately configured for each radio signal or radio channel transmitted through the NR sidelink (SL) or each set of the radio signal and the radio channel.

For example, the SCS and the CP values for the PSSS/SSSS or the PSBCH for synchronizing the sidelink (SL) and the SCS and the CP values for the PSDCH, the PSCCH and PSSCH for the transmission/reception of the discovery information, the control information, or the data information between the UEs may be configured separately.

In this case, a method of configuring the SCS and the CP values for each radio signal or radio channel may be configured according to one or more of the embodiments described by the above embodiment 2-1. In addition, the present disclosure can be applied to all combinations of a unit of the set of the radio signal or the radio channels in which the SCS and the CP values are configured. For example, according to the above embodiment, the PSSS/SSSS+the PSBCH may become a unit of one sidelink radio signal or radio channel in which the SCS and the CP are configured. The PSDCH+the PSCCH+the PSSCH may also become a unit of the other sidelink radio signal or radio channel in which the SCS and the CP are configured.

However, all cases in which the SCS and the CP are configured for the transmission/reception for each sidelink radio signal or radio channel may be included in the scope of the present disclosure regardless of a specific SCS and CP configuration. That is, even if the SCS and the CP values are configured according to the embodiments not described above, all cases in which the SCS and CP values are separately configured for each radio signal or radio channel of the NR sidelink (SL) are included in the scope of the present disclosure.

Embodiment 2-2-2. Configuration for Each Resource Pool

When configuring the resource pool for the transmission or reception of the sidelink radio signal or radio channel, it may be defined to configure the SCS and the CP value for each corresponding resource pool. For example, when the explicit configuration method of the above embodiment 2-1 is applied, it may be defined to transmit the SCS and the CP values for transmitting or receiving the radio signal or the radio channel in the corresponding resource pool through the higher layer signaling or the physical layer control signaling when configuring the resource pool for transmitting each sidelink radio channel or radio signal, or when configuring the resource pool for receiving each sidelink radio channel or radio signal.

Embodiment 2-2-3. Determination by Reference
Radio Signal and Radio Channel for Configuring
the SCS and the CP of the Sidelink (SL)

A dependency relationship for the SCS and the CP configuration between the radio signals or the radio channels of the sidelink (SL) may be defined. For example, a reference sidelink radio signal or a reference sidelink radio channel for configuring the SCS and the CP values for the sidelink radio signal or the sidelink radio channel is defined, and the SCS and the CP values for the dependent sidelink radio signal and radio channel may be determined or configured by are the reference sidelink radio signal or the reference sidelink radio channel.

For example, the PSSS/SSSS and the PSBCH may be defined as a reference for the transmission/reception of other sidelink radio channels. Accordingly, the SCS and the CP values for the transmission/reception of other sidelink radio signals and radio channels including the PSDCH, the PSCCH and the PSSCH may be defined to follow the SCS and the CP values of the PSSS/SSSS and PSBCH. The SCS and the CP values for the transmission/reception of other sidelink radio signals and radio channels including the PSDCH, the PSCCH and the PSSCH may be defined to be configured through the PSBCH.

Alternatively, the SCS and the CP values for the PSDCH may be determined by the SCS and the CP values of the corresponding PSSS/SSSS and the corresponding PSBCH, or configured by the PSBCH. The SCS and the CP values for the transmission/reception of other sidelink radio signals and radio channels including the PSCCH and the PSSCH may be determined by the SCS and the CP values of the PSDCH, or configured by the PSDCH.

Alternatively, the SCS and the CP values for the PSDCH may be determined by the SCS and the CP values of the corresponding PSSS/SSSS and the corresponding PSBCH, or configured by the PSBCH. The SCS and the CP values for the transmission/reception of the PSCCH may be determined by the SCS and the CP values of the PSDCH, or configured by the PSDCH. The SCS and the CP values for the transmission/reception of the PSCCH may be determined by the SCS and the CP values of the PSSCH, or configured by the PSCCH.

As such, all cases in which the SCS value and the CP values of any sidelink radio signal or radio channel are determined by other sidelink radio signals or radio channels, or are configured through them, are included in the scope of the present disclosure. However, the SCS and the CP values of the sidelink radio signal or the sidelink radio channel, which is referred to determine or configure the SCS and CP values of the other sidelink radio signals or radio channels, may be defined by the above-described embodiments or by other methods.

In addition, when the SCS and CP values for any sidelink radio channel or radio signal are configured by the above-described embodiments, the SCS and the CP values for the transmission of the sidelink radio signal or the sidelink radio channel may be configured separately from the SCS and the CP values for the reception of the same sidelink radio signal or the same sidelink radio channel.

In addition, the SCS and the CP values for the transmission/reception of the sidelink radio signal or the sidelink radio channel may be configured according to whether sidelink transmission mode (e.g. a scheduled transmission mode by the base station), which is the transmission mode corresponding to the TM 1 of LTE or an autonomous transmission mode through the resource pool, which is transmission mode corresponding to the TM2 of LTE is, or a discovery mode (e.g. discovery type definition corresponding to type 2b or type 1 of LTE), or a coverage state (e.g. in-coverage or out-of-coverage) Recognition. To this end, all cases in which the SCS value and the CP values of each sidelink radio signal or radio channel are determined in the form of all combinations of embodiment 2-11 and embodiment 2-2 are included in the scope of the present disclosure.

In addition, in applying the above methods, a case in which the SCS value and the CP value are configured through separate methods and signaling may also be included in the scope of the present disclosure.

Figure 13:
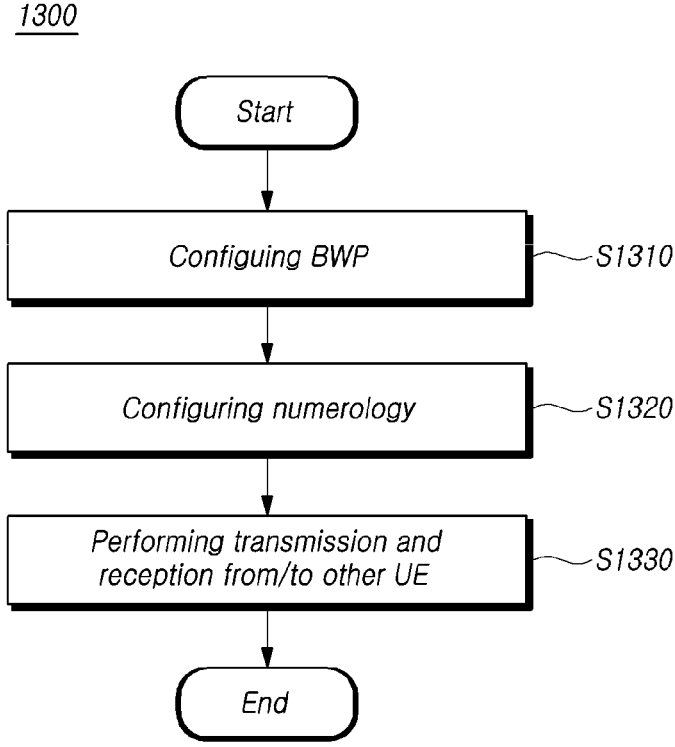
FIG. 13 is a flowchart of a method of transmitting and receiving through the sidelink in a UE according to one embodiment of the present disclosure.

FIG. 13 is a flowchart of a method of transmitting and receiving through the sidelink in a UE according to one embodiment of the present disclosure.

Referring to FIG. 13, a method of a UE for performing transmission/reception through a sidelink (SL) with another UE includes configuring a sidelink bandwidth part (SL BWP) at S1310, configuring a sidelink numerology for the transmission/reception through the sidelink (SL) at S1320 and performing the transmission/reception through the sidelink (SL) with another user equipment commonly using the configured sidelink bandwidth part (SL BWP) at S1330.

In the configuring the sidelink bandwidth part (SL BWP) at S1310, the method of configuring the bandwidth part (BWP) for the NR sidelink (SL) in the above-described first embodiment (embodiment 1) may be applied. Hereinafter, the configuring the sidelink bandwidth part (SL BWP) at S1310 will be described that the method for configuring the bandwidth part (BWP) for the NR sidelink (SL) in the above-described embodiment 1-1 is applied, but the method for configuration the bandwidth part (BWP) for the NR sidelink (SL) in the above-described embodiments 1-2 to 1-4 may be applied in the same way.

For example, as described above in the embodiment 1-1, the UE may configure the separate sidelink bandwidth part(s) (SL BWP(s)) for the sidelink transmission/reception separately from the downlink bandwidth part (s) (DL BWP (s)) and the uplink bandwidth part(s) (UL BWP(s)) for UE in the base station/network. In this case, the UE may activate the separate sidelink bandwidth part (s) (SL BWP(s)) configured for the sidelink transmission/reception and use it for the transmission/reception of the radio signal or the radio channel through the sidelink (SL).

The corresponding cell-specific or the UE-group common sidelink bandwidth part (SL BWP) may be defined such that only at most one sidelink bandwidth part (BW) is configured for the serving cell or the UE-group belonging to the serving cell. In this case, the UE may use the single sidelink bandwidth part (SL BWP) for the sidelink transmission/reception. That is, only one sidelink bandwidth part (SL BWP) may be configured for the UE.

Alternatively, the NR sidelink bandwidth part (BWP) for each UE may be configured through the cell-specific or the UE-group common higher layer signaling, and the subcarrier spacing (SCS) and the cyclic prefix (CP) values may be configured for each corresponding bandwidth part (BWP). In this case, the UE may apply the SCS and the CP values of the active sidelink bandwidth part (SL BWP) for the NR sidelink transmission/reception.

As described above, the sidelink bandwidth part (SL BWP) may be configured to be UE-specific for each UE. In this case, the base station may transmit the configuration information of the UE-specific sidelink bandwidth part through the UE-specific higher layer signaling. The corresponding UE-specific sidelink bandwidth part (SL BWP) may be defined to be configured only one by the UE.

Alternatively, the NR sidelink bandwidth part (SL BWP) may be configured through the UE-specific higher layer signaling for each UE, and the SCS and the CP values may be configured for each corresponding bandwidth part (BWP). In this case, the UE may apply the SCS and the CP values of the active sidelink bandwidth part (SL BWP) for the NR sidelink transmission/reception.

In this case, the corresponding UE may be defined to activate and use a corresponding single sidelink bandwidth part (SL BWP) for the sidelink transmission/reception without receiving additional activation-related indication information.

In other words, in NR, the bandwidth part (BWP) is used through two procedures, i) a procedure for configuring the bandwidth part (BWP) and ii) a procedure for activating the bandwidth part (BWP). However, in the present embodiment, the UE may efficiently use the bandwidth part (BWP) only by the procedure of configuring the bandwidth part (BWP). That is, the corresponding sidelink bandwidth part (SL BWP) may become an active state only by the procedure of configuring the single sidelink bandwidth part (SL BWP) is only performed in the present embodiment. Accordingly, in the present specification, the single sidelink bandwidth part is effectively activated by a procedure for configuring the single sidelink bandwidth part (SL BWP) when the radio signal or the radio channel is transmitted/received using the single sidelink bandwidth part (SL BWP).

The sidelink bandwidth part (SL BWP) may be configured separately from the bandwidth part (BWP) configured in the uplink or the downlink between the UE and the base station. Each resource pool may be configured within the sidelink bandwidth part (SL BWP).

In the configuring the sidelink numerology for the transmission/reception through the sidelink (SL), the method of configuring the numerology for the NR sidelink (SL) described in the second embodiment (embodiment 2) may be applied.

Hereinafter, the configuring the sidelink bandwidth part (SL BWP) at S1310 will be described as applying the method for explicitly configuring the numerology for the NR sidelink (SL) in the above-described embodiment 2-1-1, but the methods in the embodiments 2-1-2 to 2-2-3 may also be applied in the same way.

For example, the baser station may configure and explicitly signal the SCS and CP values for the NR sidelink transmission/reception to the UE. The UE may receive the SCS and the CP values for the NR sidelink transmission/reception from the base station.

As an example of explicitly configuring the sidelink SCS and CP values, the SCS and the CP values for the NR sidelink transmission/reception may be configured by the base station and transmitted to the UE through higher layer signaling.

Additionally, for each UE, the NR sidelink bandwidth part (SL BWP) may be configured through the UE-specific or the cell-specific higher layer signaling, and the SCS and the CP values may be configured for each corresponding bandwidth part (BWP). In this case, the SCS and CP values of the sidelink bandwidth part (SL BWP) activated for the NR sidelink transmission/reception in UE may be applied.

In other words, the sidelink numerology may be configured through the configuration information of the sidelink bandwidth part. As described above, the numerology may include the subcarrier spacing (SCS) and the cyclic prefix (CP).

The sidelink transmission/reception method according to the above-described embodiment performs the transmission/ reception through the sidelink (SL) with another UE by using the sidelink bandwidth part (SL BW) in common, so that the separate activation-related indication information may not be received.

Figure 14:
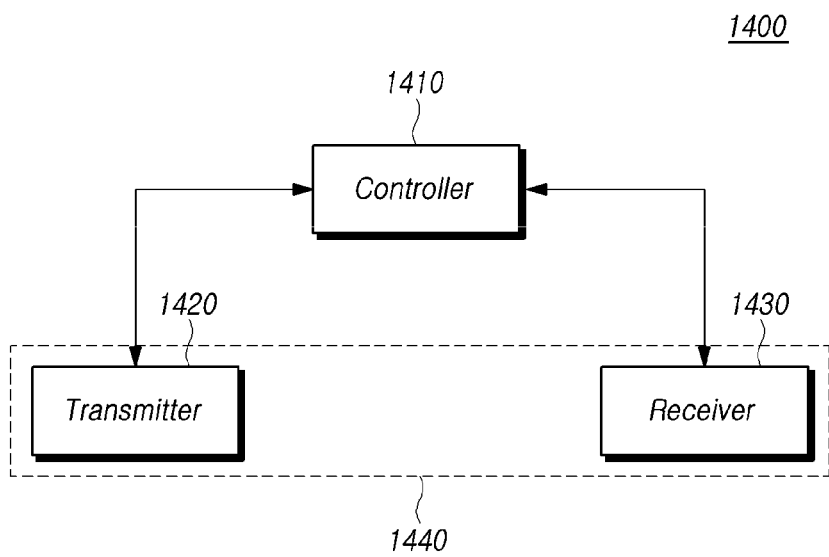
FIG. 14 is a diagram showing a base station according to an embodiment of the present disclosure.

FIG. 14 is a block diagram illustrating a base station 1400 in accordance with embodiments of the present disclosure.

Referring to FIG. 14, the base station 1400 includes a controller 1410, a transmitter 1420, and a receiver 1430.

The controller 1410 controls overall operations of the base station 1400 according to configuring the frequency resource for the sidelink transmission or reception in the next-generation radio access network according to the embodiments described above. The controller 1410 controls overall operations of the base station 1400 according to configuring the numerology for the sidelink transmission or reception in the next-generation radio access network according to the embodiments described above.

The transmitter 1420 and the receiver 1430 are used to transmit and receive signals, messages, and data needed for carrying out the embodiments described above to a UE. The receiver 1430 is used to receive signals, messages, and data needed for carrying out the embodiments described above from/to a UE. The transmitter 1420 and the receiver 1430 may be collectively referred to as a transceiver 1440.

As described above, the cell-specific or the UE-group common sidelink bandwidth part (SL BWP) may be configured with at most one sidelink bandwidth part for a serving cell or for a UE-group belonging to the serving cell. In this case, the transceiver 1440 may transmit the configuration information of the cell-specific or the UE-group common sidelink bandwidth part (SL BWP) to the UE through cell-specific or the UE-group common higher layer signaling.

In other words, the NR sidelink bandwidth part may be configured through the cell-specific or UE-group common higher layer signaling for each UE, and the SCS and the CP values may be configured for each corresponding bandwidth part (BWP) for the arbitrary UE.

In this case, the transceiver 1440 may transmit the configuration information of the UE-specific sidelink bandwidth part to the UE through UE-specific higher layer signaling. As described above, the corresponding UE-specific sidelink bandwidth part (SL BWP) may be defined to be configured at most one for UE. That is, only one sidelink bandwidth part may be configured.

Alternatively, the NR sidelink bandwidth part (SL BWP) may be configured through the UE-specific higher layer signaling for each UE, and the SCS and the CP values may be configured for each corresponding bandwidth part (BWP).

In the above examples, the transceiver 1440 does not need to transmit separate activation related indication information of the bandwidth part to the UE. In other words, in NR, the bandwidth part (BWP) is used through two separate procedures: i) a procedure for configuring the bandwidth part (BWP) and ii) a procedure for activating the bandwidth part (BWP). However, in the present embodiment, the UE may use the bandwidth part (BWP) only by the procedure of configuring the bandwidth part (BWP).

The transceiver 1440 transmits the above-described configuration information of the sidelink bandwidth part (SL BWP) to the UE through the cell-specific or the UE-group common higher layer signaling, or the UE-specific higher layer signaling.

In this case, the configuration information of the sidelink bandwidth part may include the information on the numerology described in the second embodiment (embodiment 2).

That is, the numerology may be part of the configuration information of the sidelink bandwidth part.

Figure 15:
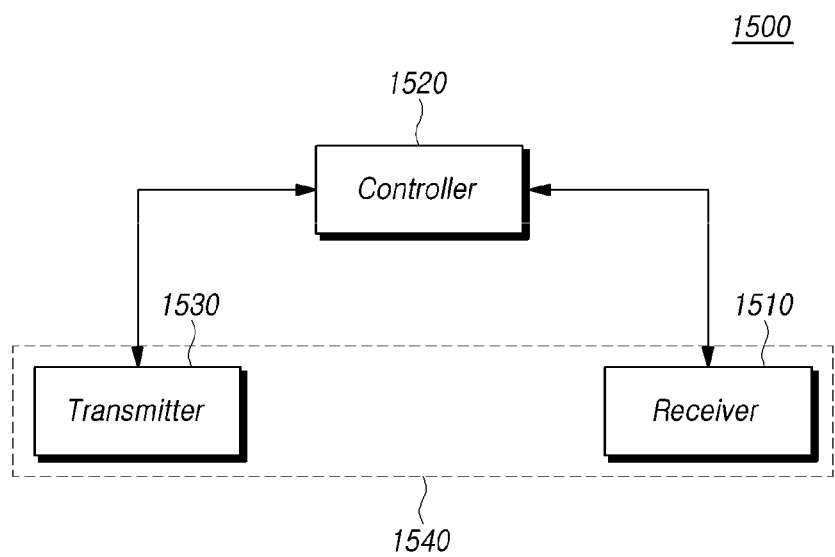
FIG. 15 is a diagram showing a UE according to an embodiment of the present disclosure.

FIG. 15 is a diagram illustrating a UE 1500 in accordance with embodiments of the present disclosure.

Referring to FIG. 15, a UE 1500 includes a receiver 1510, a controller 1520, and a transmitter 1530.

The receiver 1510 receives the downlink control information, the data and the message trough the corresponding channel from the base station.

The controller 1520 controls overall operations of the UE 1500 according to configuring the frequency resource for the sidelink transmission or reception in the next-generation radio access network according to the embodiments described above. The controller 1520 controls overall operations of the UE 1500 according to configuring the numerology for the sidelink transmission or reception in the next-generation radio access network according to the embodiments described above.

The transmitter 1530 transmits uplink control information and data or messages to the base station via a corresponding channel.

The UE 1500 according to another embodiment may be a UE that transmits and receives to/from the other UE through the sidelink (SL). The receiver 1510 and the transmitter 1530 may be collectively referred to as a transceiver 1540.

The UE includes a controller 1520 configuring the sidelink bandwidth part (SL BWP) and the sidelink numerology for the transmission/reception through the sidelink (SL) and a transceiver 1540 performing the transmission/reception through the sidelink (SL) with another UE commonly using the configured sidelink bandwidth part (SL BWP).

The controller 1520 may apply the method of configuring the bandwidth part (BWP) for the NR sidelink (SL) in the above-described first embodiment (embodiment 1) when configuring the sidelink bandwidth part. Hereinafter, in the configuring the sidelink bandwidth part (SL BWP), the controller 1520 may apply the method for configuring the bandwidth part (BWP) for the NR sidelink (SL) in the above-described embodiment 1-1 when configuring the sidelink bandwidth part. However, the present disclosure is not limited thereto. For example, the controller 1520 may apply methods in the above-described embodiments 1-2 to 1-4 in the same way.

For example, as described above in the embodiment 1-1, the controller 1520 may configure the separate sidelink bandwidth part(s) (SL BWP(s)) for the sidelink transmission/reception separately from the downlink bandwidth part(s) (DL BWP(s)) and the uplink bandwidth part(s) (UL BWP(s)) for UE in the base station/network. In this case, the controller 1520 may activate the separate sidelink bandwidth part(s) (SL BWP(s)) configured for the sidelink transmission/reception and use it for the transmission/reception of the radio signal or the radio channel through the sidelink (SL).

The corresponding cell-specific or the UE-group common sidelink bandwidth part (SL BWP) may be defined to be configured at most one sidelink bandwidth part (BW) by the serving cell or the UE-group belonging to the serving cell. In this case, the transceiver 1540 may receive the configuration information of the cell-specific or the UE-group common sidelink bandwidth part from the base station through the cell-specific or the UE-group common higher layer signaling. The controller 1520 may use the corresponding sidelink bandwidth part (SL BWP) for the sidelink transmission/reception. The sidelink bandwidth part (SL BWP) may be configured only one for the UE 1500.

Alternatively, the NR sidelink bandwidth part (BWP) for each UE may be configured through the cell-specific or the UE-group common higher layer signaling, and the subcarrier spacing (SCS) and the cyclic prefix (CP) values may be configured for each corresponding bandwidth part (BWP). In this case, the controller 1520 may apply the SCS and the CP values of the active sidelink bandwidth part (SL BWP) for the NR sidelink transmission/reception.

As described above, the sidelink bandwidth part (SL BWP) may be configured to be UE-specific for each UE. In this case, the transceiver 1540 may receive the configuration information of the UE-specific sidelink bandwidth part from base station through the UE-specific higher layer signaling. The sidelink bandwidth part (SL BWP) may be configured such that only one is configured for the UE 1500.

Alternatively, the NR sidelink bandwidth part (SL BWP) may be configured through the UE-specific higher layer signaling for each UE, and the SCS and the CP values may be configured for each corresponding bandwidth part (BWP). In this case, the controller 1520 may apply the SCS and the CP values of the active sidelink bandwidth part (SL BWP) for the NR sidelink transmission/reception.

In this case, the controller 1520 may be defined to activate and use a corresponding single sidelink bandwidth part (SL BWP) for the sidelink transmission/reception without receiving additional activation-related indication information. In other words, as mentioned above, the corresponding sidelink bandwidth part (SL BWP) may become an active state by performing only the procedure of configuring the single sidelink bandwidth part (SL BWP) in the present embodiment. Accordingly, in the present specification, the single sidelink bandwidth part is efficiently activated by a procedure for configuring the single sidelink bandwidth part (SL BWP) when the radio signal or the radio channel is transmitted/received using the single sidelink bandwidth part (SL BWP).

The sidelink bandwidth part (SL BWP) may be configured separately from the bandwidth part (BWP) configured in the uplink or the downlink between the UE and the base station. Each resource pool may be configured within the sidelink bandwidth part (SL BWP).

The controller 1520 may apply the method of configuring the numerology for the NR sidelink (SL) described in the embodiment 2 when configuring the sidelink numerology for the transmission/reception through the sidelink (SL).

Hereinafter, it will be described that the controller 1520 apply the method for explicitly configuring the numerology for the NR sidelink (SL) in the above-described embodiment 2-1-1 when configuring the sidelink bandwidth part (SL BWP) at S1310. However, the present disclosure is not limited thereto. For example, the controller 1520 may also apply the methods in the embodiments 2-1-2 to 2-2-3 in the same way.

For example, the base station may configure and explicitly signal the SCS and CP values for the NR sidelink transmission/reception to the UE. The transceiver 1540 may receive the SCS and the CP values for the NR sidelink transmission/reception from the base station.

As an example of explicitly configuring the sidelink SCS and CP values, the SCS and the CP values for the NR sidelink transmission/reception may be configured by the base station and transmitted to the UE through higher layer signaling.

Additionally, for each UE, the NR sidelink bandwidth part (SL BWP) may be configured through the UE-specific or the cell-specific higher layer signaling, and the SCS and the CP values may be configured for each corresponding bandwidth part (BWP). In this case, the SCS and CP values of the sidelink bandwidth part (SL BWP) activated for the NR sidelink transmission/reception in UE may be applied.

In other words, the sidelink numerology may be configured through the configuration information of the sidelink bandwidth part. As described above, the numerology may include the subcarrier spacing (SCS) and the cyclic prefix (CP).

The transceiver 1540 receives the above-described configuration information of the sidelink bandwidth part through the cell-specific or the UE-group common higher layer signaling, or the UE-specific higher layer signaling from the base station.

In this case, the configuration information of the sidelink bandwidth part may include information on the numerology described in the embodiment 2. That is, the numerology may be part of the configuration information of the sidelink bandwidth part.

The sidelink transmission/reception method according to the above-described embodiment performs the transmission/reception through the sidelink (SL) with another UE by using the sidelink bandwidth part (SL BW) in common, so that the separate activation-related indication information may not be received.

The sidelink transmission/reception method according to the above-described embodiments, and the UE may effectively perform the transmission/reception through the sidelink with another UE using the sidelink bandwidth part (SL BWP).

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims the priority benefit of Korean Patent Application No. 10-2018-0093030, filed on Aug. 9, 2018, No. 10-2018-0093015, filed on Aug. 9, 2018 and No. 10-2019-0095644 filed on Aug. 6, 2019 in the Korean Intellectual Property Office, in accordance with the U.S. Patent Law 35 USC § 119(a), the disclosures of which are incorporated herein by reference in their entirety. In addition, if this application claims the priority benefit for countries other than the United States for the same reason as above, the disclosures of which are incorporated herein by reference in their entirety.

The invention claimed is:

1. A method of a user equipment for performing transmission/reception through a sidelink with another user equipment, the method comprising:
configuring an uplink bandwidth part, the configured uplink bandwidth part permitting a transceiver of the user equipment to perform communication with a base station;
configuring a sidelink bandwidth part;
configuring a sidelink numerology for the transmission/reception through the sidelink with another user equipment; and
performing, by the transceiver, the transmission/reception through the sidelink with another user equipment commonly using the configured sidelink bandwidth part,
wherein the sidelink bandwidth part is configured such that the configured sidelink bandwidth part follows the configured uplink bandwidth part and such that an activation of the configured sidelink bandwidth part occurs separately from an activation of the uplink bandwidth part, the activation of the configured sidelink bandwidth part implicitly determined in the user equipment as a state of sidelink bandwidth part activation, the activation of the uplink bandwidth part determined by the base station as a state of uplink bandwidth part activation,
wherein the activation of the configured sidelink bandwidth part implicitly determined in the user equipment enables both the transmission/reception through the sidelink with another user equipment in the state of sidelink bandwidth part activation and the communication with the base station in the state of uplink bandwidth part activation,
wherein the configuring the sidelink bandwidth part includes configuring a plurality of sidelink bandwidth parts for one uplink bandwidth part, and
wherein the method further comprises configuring each of the plurality of sidelink bandwidth parts separately for a sidelink transmission/reception, such that a bandwidth part for the sidelink transmission and a bandwidth part for the sidelink reception for each sidelink transmission or reception in a corresponding active uplink bandwidth part is activated, respectively.

2. The method according to claim 1, wherein the sidelink bandwidth part is configured separately from a bandwidth part configured for uplink or downlink between the user equipment and the base station.

3. The method according to claim 1, further comprising configuring each of a plurality of resource pools within the sidelink bandwidth part.

4. The method according to claim 1, wherein the sidelink numerology is configured through configuration information of the sidelink bandwidth part.

5. The method according to claim 4, wherein the sidelink numerology is a subcarrier spacing and a cyclic prefix.

6. A user equipment for performing transmission/reception through a sidelink with another user equipment, the user equipment comprising:

a transceiver; and a controller for configuring an uplink bandwidth part, the configured uplink bandwidth part permitting the transceiver to perform communication with a base station, configuring a sidelink bandwidth part, and configuring a sidelink numerology for the transmission/reception through the sidelink with another user equipment, wherein the transceiver further performs the transmission/reception through the sidelink with another user equipment commonly using the configured sidelink bandwidth part, wherein the controller configures the sidelink bandwidth part such that the configured sidelink bandwidth part follows the configured uplink bandwidth part and such that an activation of the configured sidelink bandwidth part occurs separately from an activation of the uplink bandwidth part, the activation of the configured sidelink bandwidth part implicitly determined in the controller as a state of sidelink bandwidth part activation, the activation of the uplink bandwidth part determined by the base station as a state of uplink bandwidth part activation, wherein the activation of the configured sidelink bandwidth part implicitly determined in the controller enables both the transmission/reception through the sidelink with another user equipment in the state of sidelink bandwidth part activation and the communication with the base station in the state of uplink bandwidth part activation, wherein the configuring the sidelink bandwidth part includes configuring a plurality of sidelink bandwidth parts for one uplink bandwidth part, and wherein the controller further configures each of the plurality of sidelink bandwidth parts separately for a sidelink transmission/reception, such that a bandwidth part for the sidelink transmission and a bandwidth part for the sidelink reception for each sidelink transmission or reception in a corresponding active uplink bandwidth part is activated, respectively.

7. The user equipment according to claim 6, wherein the sidelink bandwidth part is configured separately from a bandwidth part configured for uplink or downlink between the user equipment and the base station.

8. The user equipment according to claim 6, wherein the controller further configures each of a plurality of resource pools within the sidelink bandwidth part.

9. The user equipment according to claim 6, wherein the sidelink numerology is configured through configuration information of the sidelink bandwidth part.

10. The user equipment according to claim 9, wherein the sidelink numerology is a subcarrier spacing and a cyclic prefix.

11. The user equipment according to claim 6, wherein the user equipment activates and uses a corresponding single sidelink bandwidth part for the transmission/reception through the sidelink with another user equipment without receiving additional activation-related indication information, such that the corresponding single sidelink bandwidth part is activated by only configuring the corresponding single sidelink bandwidth part.

12. The method according to claim 1, wherein the user equipment activates and uses a corresponding single sidelink bandwidth part for the transmission/reception through the sidelink with another user equipment without receiving additional activation-related indication information, such that the corresponding single sidelink bandwidth part is activated by only configuring the corresponding single sidelink bandwidth part.

13. The method according to claim 1, wherein the configuring the uplink bandwidth part includes configuring a plurality of uplink bandwidth parts to communicate with the base station, and wherein the method further comprises configuring a sidelink bandwidth part associated with each of the plurality of uplink bandwidth parts, respectively, such that an activation of a sidelink bandwidth part corresponding to one of the plurality of uplink bandwidth parts is determined by an activation of the one of the plurality of uplink bandwidth parts.

14. The user equipment according to claim 6, wherein the configuring the uplink bandwidth part includes configuring a plurality of uplink bandwidth parts to communicate with the base station, and wherein the controller further configures a sidelink bandwidth part associated with each of the plurality of uplink bandwidth parts, respectively, such that an activation of a sidelink bandwidth part corresponding to one of the plurality of uplink bandwidth parts is determined by an activation of the one of the plurality of uplink bandwidth parts.

* * * * *